United States Patent [19]

Moore

[11] Patent Number: 4,473,868
[45] Date of Patent: Sep. 25, 1984

[54] LIGHT SUPPORT ASSEMBLY FOR TOW TRUCKS

[75] Inventor: Vernon S. Moore, Ringgold, Ga.

[73] Assignee: Dover Corporation, Chattanooga, Tenn.

[21] Appl. No.: 546,818

[22] Filed: Oct. 31, 1983

[51] Int. Cl.³ .......................... B60Q 7/00; F21V 21/26
[52] U.S. Cl. ........................................ 362/80; 362/66; 362/274; 362/288; 362/371; 362/427; 340/87; 340/132; 248/293
[58] Field of Search ..................... 362/35, 61, 66, 70, 362/74, 80, 269, 271, 274, 285, 287, 288, 311, 370, 371, 402, 418, 426, 427, 428, 432; 340/84, 87, 127, 128, 129, 130, 131, 132, 138, 142; 248/280.1, 281.1, 292.1, 293; 108/9, 48, 124; 312/21, 27, 30, 313; 52/27, 28, 113

[56] References Cited

U.S. PATENT DOCUMENTS

| | | | |
|---|---|---|---|
| 2,516,480 | 7/1950 | O'Shei | 340/132 |
| 2,692,749 | 10/1954 | Cripe | 248/293 |
| 3,229,945 | 1/1966 | Hartman | 362/70 X |
| 3,331,957 | 7/1967 | Adams et al. | 362/61 |
| 3,351,904 | 11/1967 | Noruk | 340/87 |
| 3,761,890 | 9/1973 | Fritts et al. | 362/66 X |
| 3,783,267 | 1/1974 | Thomas | 362/80 X |
| 4,180,010 | 12/1979 | McDermott et al. | 362/80 X |
| 4,192,427 | 3/1980 | Bergman | 362/66 X |
| 4,259,660 | 3/1981 | Oliver | 362/66 X |
| 4,395,749 | 7/1983 | Poveromo | 362/80 X |

FOREIGN PATENT DOCUMENTS

| | | | |
|---|---|---|---|
| 76719 | 6/1980 | Japan | 362/66 |
| 335279 | 9/1930 | United Kingdom | 362/74 |
| 489253 | 7/1938 | United Kingdom | 340/132 |

*Primary Examiner*—David H. Brown
*Assistant Examiner*—John E. Griffiths, Jr.
*Attorney, Agent, or Firm*—Alan Ruderman

[57] ABSTRACT

A light mounting assembly for mounting safety lights on a towing vehicle includes a light carrying portion pivotably mounted to an attaching portion for pivoting the light carrying portion from a disposition normally on the top of the winching frame of the vehicle into a retracted position between the winching frame and the cab of the vehicle. The attaching portion includes a pair of bracket members adapted to be secured to the winching frame intermediate the frame and the cab and includes a rod rotatably carried by and spanning the attaching bracket members. A pair of cam members are fastened to the rod adjacent the attaching bracket members. The light carrying portion has two end members interconnected by a central support bar, and an arm fastened to each end member pivotably connects the end member to the respective attaching bracket member. Each arm includes a dog which cooperates with a notch in a respective cam for locking the dog in the notch, and a spring acts to urge the dogs and notches into locking engagement. Manual rotation of the rod overcomes the bias of the spring to permit the lights to pivot into the retracted position.

17 Claims, 6 Drawing Figures

U.S. Patent	Sep. 25, 1984	4,473,868

LIGHT SUPPORT ASSEMBLY FOR TOW TRUCKS

BACKGROUND OF THE INVENTION

This invention relates to a retractable safety light support assembly for towing vehicles and the like and more particularly to such an assembly which permits the safety lights to be positioned in a normal upstanding disposition and to be pivoted into a retracted position behind the cab of the vehicle when the vehicle passes beneath low clearance structures.

Emergency vehicles such as tow trucks generally, if not always, include emergency or safety lights mounted on an elevated portion thereon. On a tow truck these lights are normally mounted in bubbles or a continuous container bar on the top of the frame of the wrecker, i.e., the frame which supports some of the winching equipment. However, in low clearance situations, such as entry into a garage, the bubbles or light bar may engage the structure and can be easily broken. Consequently, various arrangements for moving lights from the elevated position to a retracted position have been proposed by the prior art. For example, in Hartman U.S. Pat. No. 3,229,945 a bracket for carrying a light is mounted on the rear of the cab and can be retracted by a lever extending through and into the cab, a roller within the cab engaging a notch on the lever to secure it. Since the bracket is supported by a simple lever only a single light can be carried by such a construction, and if the vehicle is jolted such as on rough roads, the roller and notch may accidently disengage. In Bergman U.S. Pat. No. 4,192,427 a torsion bar extends across and is pivoted on a flange at the rear of the winching frame, the bar being welded to a light carrying bracket mounted at the outboard side at each end of the frame and extending to the rear edge of the flange. A lever welded to the torsion bar cooperates with a notch on a plate secured to one end of the frame and may be manipulated to pivot the torsion bar and thus the light brackets. However, this construction could not be used when the vehicle has a light bar, i.e., an elongated light container. Moreover, on some tow trucks braces extend from the rear edge of the flange of the winching frame for additional support and the location of the braces relative to the flange would preclude a torsion bar extending across the vehicle, while in other winching frames the design of the flange is such that it is incapable of carrying a torsion bar.

SUMMARY OF THE INVENTION

Consequently, it is a primary object of the present invention to provide a simple, reliable and relatively inexpensive light support assembly for carrying the emergency or safety lights of a towing vehicle which permits the lights to be pivoted from a secure upstanding operative position to an inoperative position disposed below the top of the vehicle.

It is another object of the present invention to provide a retractable light support assembly for a towing vehicle which could be universally utilized with substantially any winching frame sufficiently spaced from the cab for permitting the lights to be stored between the frame and the cab when retracted.

It is a further object of the present invention to provide a light support assembly for carrying the safety lights of a towing vehicle, the assembly including a light carrying portion pivotable relative to a vehicle mounting portion which is secured to the winching frame of the vehicle, the light carrying portion being held by locking members which positively hold the light carrying portion and lights in the normal position, the construction requiring a rotational disengagement of the locking members before the light carrying portion may be pivoted into a retracted position between the cab of the vehicle and the winching frame.

Accordingly, the present invention provides a light support assembly comprising an attaching portion having a pair of spaced bracket members adapted to be secured to the forward end of the winching frame at opposite sides of a towing vehicle, and a light carrying portion including a pair of end members and a central support bar fastened to and spanning the end members, the lights being mounted on a substantially planar surface of the end members. Each end member includes an arm pivotably connected to a respective bracket member so that the light carrying portion may be pivotably moved from an operative position where the light mounting surface is in an elevated substantially horizontal disposition to a stored position where it is retracted below the top of the winching frame between the frame and the cab of the vehicle. The arms include locking dogs which cooperate with respective notches in camming members fastened to a rod rotatably carried by the attaching portion brackets, the rod being resiliently urged normally to position the cams in locking engagement with the dogs and requiring a positive rotational force to disengage the locking engagement. After release of the locking engagement, the light carrying portion may be pivoted into the stored position.

BRIEF DESCRIPTION OF THE DRAWINGS

The particular features and advantages of the invention as well as other objects will become apparent from the following description taken in connection with the accompanying drawings, in which.

DESCRIPTION OF THE PREFERRED EMBODIMENT

Figure 1:
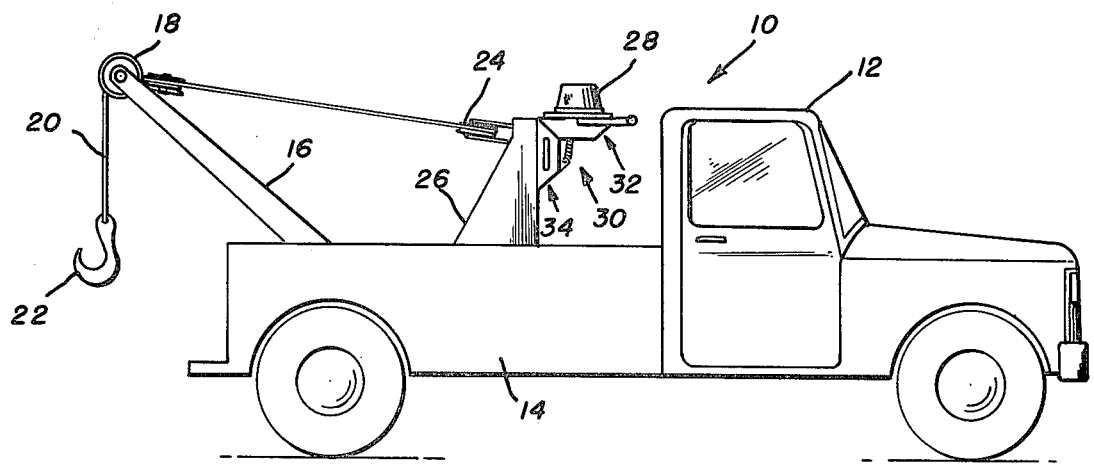
FIG. 1 is a side elevational view of a towing vehicle having a light mounting assembly constructed in accordance with the principles of the present invention, the assembly and lights being in their normal operative upstanding position.

Referring now to the drawings, and particularly to FIG. 1, apparatus constructed in accordance with the principles of the present invention is illustrated on a tow truck 10. The tow truck includes a cab 12 at the forward end thereof and a bed 14 extending rearwardly from the cab, the cab and bed being mounted conventionally on the chassis of the vehicle. Carried by the bed 14 is the lifting, winching and towing apparatus generally consisting of a tiltable boom 16 which may carry a pulley 18 about which a cable 20 is trained. The cable carries a disabled vehicle engaging means such as a hook 22 or the like at one end and is trained about pulleys 24 or the like carried by support structure comprising an upstanding frame 26 spaced from the cab 12, the cable being driven by conventional power winching means (not illustrated). Conventionally, safety lights 28 would be mounted on the top of the frame, but in accordance with the present invention the lights 28 are carried on a light support assembly indicated at 30 in FIG. 1 and constructed in accordance with the present invention as hereinafter described. It should be understood that the lights 28 may be of either the bubble type or a light containing bar extending across the frame 26.

Figure 3:
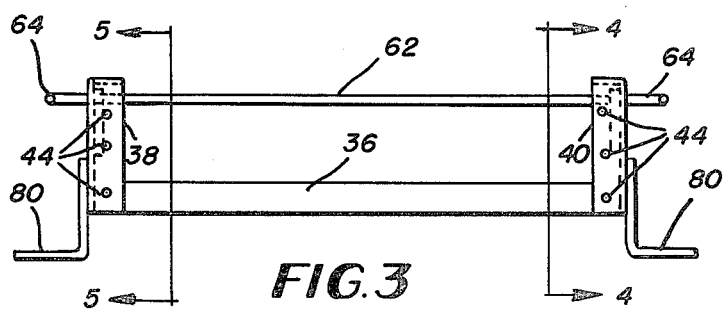
FIG. 3 is a top plan view of the assembly in the normal operating position but removed from the vehicle and with the lights removed.

The assembly 30 includes a light carrying portion 32 which is pivotably mounted to a base or attaching portion 34 as hereinafter described. The light carrying portion 32, as best illustrated in FIG. 3, comprises a central support bar 36 and a pair of end bracket members 38, 40 secured to a respective end of the support bar, the members 38, 40 extending from the support bar in the same direction substantially normal thereto. Preferably the bar 36 and each of the brackets 38, 40 are steel support angle members welded together into a rigid structure for supporting a light carrying mounting plate 42 secured thereto on the common substantially planar surfaces of at least the brackets 38 and 40 by means of fasteners (not illustrated) connected through holes 44 in the brackets 38, 40. Secured as by welding to the inner facing surfaces of each angular bracket 38, 40 and extending substantially normal to the surface on which the light mounting plate 42 is disposed is a respective arm 46, 48, the purposes of which will hereinafter become understood.

Figure 4:
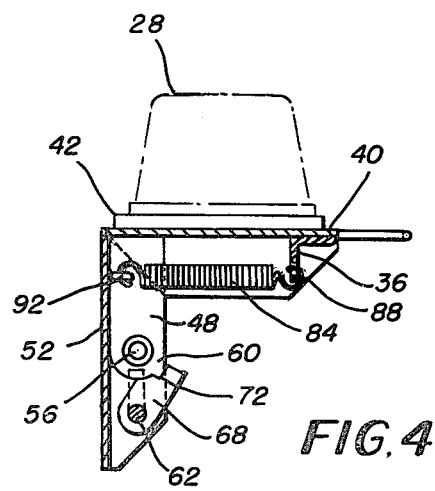
FIG. 4 is a cross sectional view taken substantially along line 4—4 of FIG. 3.
Figure 6:
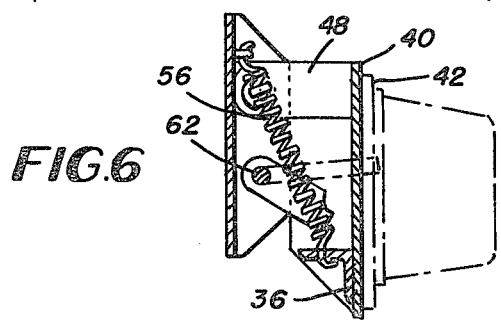
FIG. 6 is a view similar to FIG. 4 but with the light carrying portion pivoted into the retracted position.
Figure 5:
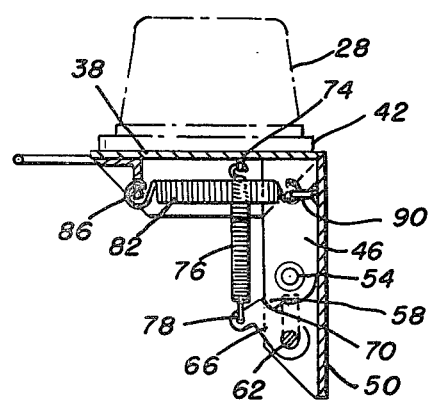
FIG. 5 is a cross sectional view taken along line 5—5 of FIG. 3.

With reference to FIGS. 4–6, the attaching portion 34 comprises a pair of spaced bracket members 50, 52 comprising steel support angle members. One leg of each member 50, 52 is secured to the cab ends of the frame 26 at opposed sides of the bed 14, while the other leg of each member 50, 52 carries a respective journal pin 54, 56 on which a respective one of the arms 46, 48 is pivotably journalled. Consequently, the light carrying portion 32 is carried by and may pivot relatively to the attaching portion 34.

Each arm 46, 48 at the end remote from the respective light carrying bracket 38, 40 has a respective catch or dog 58, 60 extending therefrom, the detent being spaced from the journals 54, 56 and protruding from the surface of the arms. Journally extending between and through the attaching portion brackets 50, 52 spaced from the axes of the journal pins 54, 56 is a rod 62. Each end of the rod 62 extends beyond the surface of the respective brackets 50, 52 and is bent into the form of a crank or lever arm 64 so that the rod 62 may be pivoted relative to the brackets 50, 52 from either side of the vehicle by turning one of the cranks 64. Fastened on the rod adjacent a respective bracket 50, 52 is a pair of locking cams 66, 68 having a respective detent or notch 70, 72 disposed for engaging with a respective one of the dogs 58, 60 to prevent the arms 46, 48 from pivoting when so engaged, the disposition of the arms when in the locked position being upstanding as illustrated in FIGS. 4 and 5 so that the light mounting plate 42 is disposed in a substantially horizontal position, and vertically above the brackets 50, 52 of the attaching portion 34, this being the normal or operative position of the lights and the assembly 30. The notch has a cam surface or ramp which permits the disengagement of the dog from the notch when the rod 62 is rotated away from the bracket members 50, 52. At least one of the end brackets 38, 40 of the light carrying portion 32, such as bracket 38, has a hook 74 for securing one end of a coil spring 76, the other end of the spring being secured to a protuberence or lug 78 extending from at least one of the locking cam, e.g., cam 66. The disposition of the lug 78 relative to the axis of the rod 62 is such that the spring 76 tends to rorate the cam 66 clockwise as viewed in FIG. 5 thereby engaging the closed end of the notch 70 with the dog 58. This ensures that both the dogs 58, 60 of the arms 46, 48 engage any lock with the respective notches 70, 72 in the cams 66, 68 when the structure is in the operative position for securely locking the lights in the upstanding position.

Figure 2:
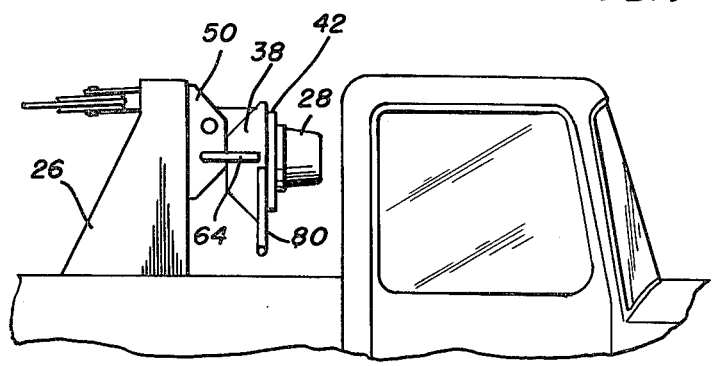
FIG. 2 is a partial elevational view on a slightly larger scale than FIG. 1, with the lights pivoted into the retracted position.

To lower the lights to the inoperative position when entering low clearance structures, such as the entrance to a garage, the rod 62 is pivoted by manually turning one of the cranks 64 to slide the ramp of the cam notch along the dog which releases the locking action of the cams 66, 68 with the dogs 58, 60. A manual force sufficient to overcome the urging of the spring 76 is required to effect a rotation of the cam 66 and 68 and permit the open side of the notches 70, 72 to slide along the ramp and out of locking engagement with the respective dogs 58, 60. Once the cams 66, 68 are released from the arms 46, 48 the light carrying portion 32 may be pivoted about the journal pins 54, 56 relative to the attaching portion 34 into a stored retracted position where the light mounting plate 42 is disposed in a substantially vertical position horizontally spaced from the brackets 50, 52 as illustrated in FIGS. 2 and 6. In this position the lights are disposed behind the cab 12 in the space between the cab and the frame 26. To aid in pivoting the light carrying portion 32, a crank arm 80 may be fastened as by welding to one and preferably both of the brackets 38, 40 so the light carrying portion 32 may be pivoted from either side of the vehicle. One or more springs 82, 84 may be fastened to respective lugs 86, 88 on the bar 36 and to lugs 90, 92 on the respective bracket 46, 48 for counterbalancing the weight of the lights 28, light support plates, etc. mounted on the light carrying portion 32 so as to prevent unintentional rapid pivoting of the light support portion about the pins 54, 56 once the cams are disengaged, and for ease in returning the lights to the raised position.

Consequently, a simple and relatively inexpensive structure is proposed for carrying the safety lights of a tow truck or the like and which allows the same to be pivoted from an upstanding operative position to an inoperative position disposed below the top of the vehicle.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. A light mounting assembly for mounting safety lights on a towing vehicle having a cab and an upstanding frame spaced from the cab, said assembly comprising an attaching portion having a pair of attaching brackets adapted to be fastened at laterally spaced apart locations to said frame intermediate said frame and said cab, and a light carrying portion having a pair of end bracket members spaced apart a distance substantially equal to the spacing between said attaching brackets and having surfaces defining a substantially planar support for said lights, an arm secured to each of said end bracket members and extending in a direction substantially normal to said planar support, means for pivotably mounting each arm on its respective attaching bracket, whereby said planar support selectively may be moved from a substantially horizontal disposition with the lights in an elevated position to a substantially vertical disposition with the lights retracted intermediate said frame and said cab, each of said arms having a dog extending therefrom, a rod pivotably carried by and spanning said attaching brackets, a cam corresponding to each arm secured to said rod at locations adjacent its respective attaching bracket, each cam having a dog receiving notch for precluding rotation of said rod in one direction when said dog is engaged in said notch while permitting rotation of said rod in the opposite direction, said dogs being engaged in said notches when said planar support is in a substantially horizontal disposition, resilient means for urging said rod in said one direction to lock each dog into its respective notch, and crank means on said rod for manually turning said rod in said opposite direction to disengage said cams from said dogs and permit said light carrying portion to pivot to a position wherein said planar support is disposed in said substantially vertical disposition.

2. A light mounting assembly as recited in claim 1, wherein said resilient means is connected between at least one of said cams and one of said end bracket members.

3. A light mounting assembly as recited in claim 1, wherein said resilient means comprises a coil spring having one end connected to one of said end bracket members and another end connected to one of said cams.

4. A light mounting assembly as recited in claim 1, wherein said crank means comprises a crank at each end of said rod, whereby said rod may be turned from either side of the vehicle.

5. A light mounting assembly as recited in claim 1, wherein said attaching brackets are connected together by a central support bar, and each of said end bracket members includes a crank for manually pivoting said light carrying portion from either side of the vehicle.

6. A light mounting assembly as recited in claim 5, including resilient means connected between each attaching bracket and said central support bar for counterbalancing the weight of said lights.

7. A light mounting assembly as recited in claim 4, wherein said attaching brackets are connected together by a central support bar, and each of said end bracket members includes a crank manually pivoting said light carrying portion from either side of the vehicle.

8. A light carrying assembly as recited in claim 7, including resilient means connected between each attaching bracket and said central support bar for counterbalancing the weight of said lights.

9. A light mounting assembly as recited in claim 5, wherein each of said attaching brackets, end bracket members and central support bar comprises an angle member.

10. A light mounting assembly for mounting safety lights on a towing vehicle having a cab and an upstanding frame spaced from the cab, said assembly comprising an attaching portion having a pair of attaching brackets adapted to be fastened at spaced locations adjacent opposite sides of said frame intermediate said frame and said cab, and a light carrying portion having a pair of end bracket members spaced apart a distance substantially equal to the spacing between said attaching brackets and having surfaces defining a substantially planar support for said lights, each of said end bracket members including means for pivotably mounting the end bracket members to their respective attaching bracket for pivotable movement about a substantially horizontal axis for locating said planar support selectively in a substantially horizontal disposition and a substantially vertical disposition, a rod extending through each attaching bracket in journalled fashion for rotation relative thereto, a cam corresponding to each end bracket member secured to said rod at locations adjacent its respective attaching bracket, cooperating means carried by each cam and its respective end bracket member includes cooperating means for locking said rod against rotation in one direction and permitting rotation of said rod in the opposite direction said cooperating means being locked when said planar support is in a substantially horizontal disposition, resilient means for urging said rod in said one direction to engage said cooperating locking means, and grasping means on said rod for permitting said rod to turn in said opposite direction to disengage said cooperating locking means and permit said light carrying portion to pivot into a disposition wherein said planar support is disposed in said substantially vertical disposition.

11. A light mounting assembly as recited in claim 10, wherein said resilient means is connected between at least one of said cams and one of said end bracket members.

12. A light mounting assembly as recited in claim 10, wherein said resilient means comprises a coil spring having one end connected to one of said end bracket members and the other end connected to one of said cams.

13. A light mounting assembly as recited in claim 10, wherein said grasping means includes a gripping member at each end thereof, whereby said rod may be turned from either side of the vehicle.

14. A light mounting assembly as recited in claim 13, wherein said attaching brackets are connected together by a central support bar, and each of said end bracket members includes grasping means for manually pivoting said light carrying portion from either side of the vehicle.

15. A light mounting assembly as recited in claim 14, wherein said resilient means comprises a coil spring having one end connected to one of said end bracket members and the other end connected to one of said cams.

16. A light mounting assembly as recited in claim 15, including resilient means connected between each attaching bracket and said central support bar for counterbalancing the weight of said lights.

17. A light mounting assembly as recited in claim 16, wherein each of said attaching brackets, end bracket members and central support bar comprises an angle member.

* * * * *